United States Patent [19]
Swisher

[11] 3,821,449
[45] June 28, 1974

[54] METHOD OF DEHYDRATING CITRUS PEEL

[75] Inventor: Horton E. Swisher, Upland, Calif.

[73] Assignee: Sunkist Growers, Inc., Sherman Oaks, Calif.

[22] Filed: Feb. 26, 1971

[21] Appl. No.: 119,334

Related U.S. Application Data

[63] Continuation-in-part of Ser. No. 689,908, Dec. 12, 1967, abandoned.

[52] U.S. Cl. .................................. 426/438, 426/442
[51] Int. Cl. ................................................ A23b 7/02
[58] Field of Search ............. 99/100, 103, 154, 199, 99/204

[56] References Cited
UNITED STATES PATENTS 2,976,159 3/1961 Swisher .............................. 99/204
3,219,458 11/1965 Higby ................................. 99/105
3,261,694 7/1966 Forkner ............................. 99/204

Primary Examiner—Wilbur L. Bascomb, Jr.
Assistant Examiner—Martin G. Mullen
Attorney, Agent, or Firm—Paul A. Weilein

[57] ABSTRACT

Raw fresh citrus peel is immersed in hot vegetable oil and under atmospheric pressure to partially dehydrate the peel. Vacuum is then applied to further dehydrate the peel to a moisture content of 15 percent or less, and the peel is then separated from the oil and drained. In some instances the dehydrated peel is finally impregnated with a hardenable polyol-sugar composition.

5 Claims, 1 Drawing Figure

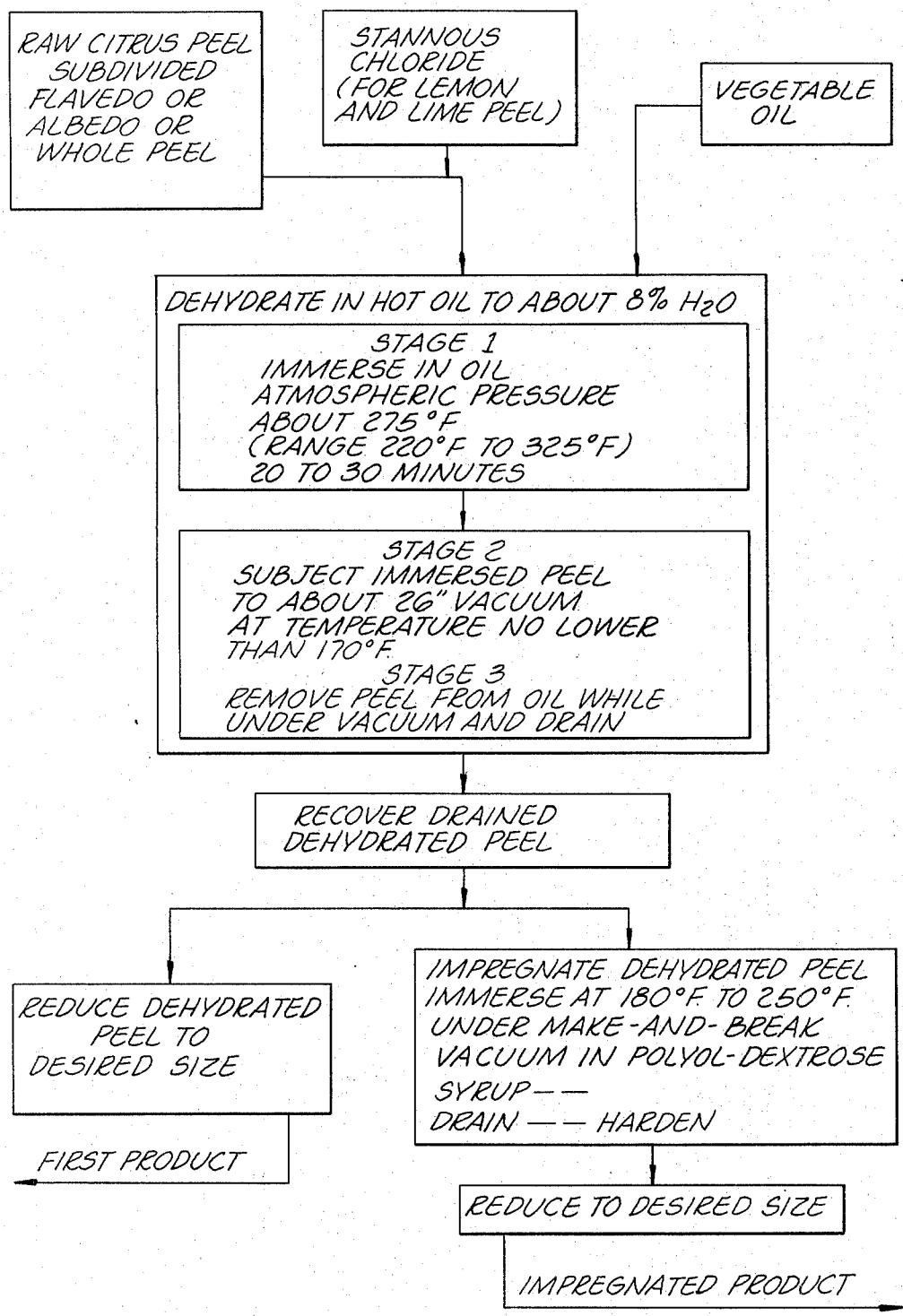

METHOD OF DEHYDRATING CITRUS PEEL

CROSS-REFERENCE TO RELATED APPLICATION

This application is a continuation-in-part of my co-pending application Ser. No. 689,908, filed Dec. 12, 1967 now abandoned.

This invention relates to foodstuffs.

It deals with dehydrated foods and a dehydration method. It has to do especially with those portions of various citrus fruits which are naturally somewhat spongy and after dehydration are subject to reconstitution by the addition of water so that they may be used advantageously in other food products such as for baked cakes and yield a natural "bite" feeling in the mouth. The presently preferred fruits or fruit portions are citrus peels, including orange, lemon, tangelo, lime, grapefruit, and tangerine peels. These citrus fruit peels, after they have been dehydrated according to this invention, and also subjected to further treatment if desired, have inherent natural flavors that render them attractive for food additions.

Importantly, the method includes as an early stage rapid dehydration of the raw, fresh citrus peel in hot vegetable oil for the purpose of evaporating a very substantial portion of the original natural water content, which treatment is done above the boiling point of water, such as 275° F. After such treatment at atmospheric pressure for 20 or 30 minutes, the treating equipment (reactor) is then placed under vacuum, such as a 26 inch (Hg) vacuum, and the treatment continued for another five to twenty minutes to reduce the water content to a desired range, such as between about 2 and 10 percent by weight, or to an optimum percentage around 6 to 8 percent, where the oil where the oil temperature at start of processing might have been about 275° F. Because of evaporative cooling during vacuum treatment the temperature will fall and rise again. When the temperature rises to around 200° to 230° F depending on the nature of the peel, the perforated basket carrying the peel pieces is then preferably raised from the hot oil, in which the peel had been treated, to a position above the surface of the oil for drainage of excess oil from the peel, while still maintaining the vacuum. After breaking the vacuum, the basket and contents are preferably centrifuged for a short time, such as 1 to 3 minutes, to further remove residual vegetable oil.

The peel thus treated may be reduced to desired particle or piece sizes and used in that state. On the other hand, and preferably, the treated peel will be subjected to an impregnation step to yield a product of maximum utility and stability. This impregnation will be accomplished, for example, by introduction of the dehydrated product into a hot flavor-improving syrup, such as 50% dextrose dissolved in glycerol which will harden and fill the cellular interstices of the particles upon cooling. Unexpectedly, we have discovered that impregnation of the peel with polyol-sugar mixtures greatly improves the oxidative stability of the product. During this treatment additional residual vegetable oil will be displaced by operating with a vacuum make-and-break procedure to facilitate both impregnation and vegetable oil removal. The product is then drained in the carrying basket used and allowed to cool. It is then reduced to whatever size is required or desired for marketing. In the preparation of citrus peel, the whole peel, including the outer flavedo layer and the inner white albedo layer may be used. It is preferable to remove the rag that clings to the inner side of the peel. Again, the flavedo layer may be shaved off and used, or the flavedo layer may be shaved off and discarded, only the albedo layer being then used. The portion employed for processing will depend largely upon the flavor and color of the product required.

BACKGROUND

So far as known, my earlier U.S. Pat. No. 2,976,159 of Mar. 21, 1961, constitutes the principal prior art here concerned. The outstanding difference is that the raw, fresh, unfrozen citrus peel being treated is, according to the present invention, first dehydrated by treatment in heated vegetable oil, such as soybean oil or coconut oil or other oils hereinafter mentioned. The use of stannous chloride to treat citrus juices is disclosed in Higby et al. U.S. Pat. No. 3,219,458 of Nov. 23, 1965.

The principal advantages of peel prepared according to the present invention over that as described in U.S. Pat. No. 2,976,159 are as follows: (1) the peel can be easily ground to any desired size without clogging up the mill; (2) there are no hard lumps that are irreversibly dehydrated, making the product hard to reconstitute and difficult to eat; (3) for the first time a flavorful and useful dehydrated lemon peel can be made; and (4) the peel retains a considerable amount of natural vitamin C.

The proposal has been made to freeze various fruit peels prior to dehydrating by various means. However, because of the unique character of citrus peels, any freezing of the peel prior to dehydrating is highly disadvantageous, since the texture of the peel is adversely affected and cannot be restored by any process of which I am aware. The principal use of the products of the present invention is in food products which are chewed, and the texture and feel of the treated citrus peel is important for a satisfactory product. Accordingly, the citrus peel is referred to in this specification and in the claims which follow as unfrozen, by which term it is to be understood that the peel not only is not frozen at the time of immersion in the hot oil, but moreover it never has been subjected to freezing, which, as just mentioned, irrevocably damages its texture.

The unique character of the peel of citrus fruits is shown in standard textbooks on botany and plant physiology. One such text is *THE CITRUS INDUSTRY*, Vol. I by H. J. Webber and L. B. Batchelor, Berkeley, University of California Press, 1943.

SUMMARY OF THE INVENTION

This invention, therefore, resides in first treating the raw, fresh, unfrozen citrus peel pieces in a suitable hot vegetable oil at temperatures somewhat above the boiling point of water for the purpose of reducing the moisture content to whatever is considered optimum for the purpose, such as between 5 and 10 percent or about 8 percent, and in any event below 15 percent, treatment having preferably been first conducted at atmospheric pressure and then completed under vacuum. For minimum retention of vegetable oil, the peel is drained while under vacuum. Another aspect of the invention is the subsequent treatment of the dehydrated product with a hot viscous syrup containing dextrose or the like dissolved in such a polyol as glycerol which will become a semi-solid upon cooling, whereby further to displace some of the residual vegetable oil and also to harden the treated food particles to yield a product of natural texture and color having outstanding flavor stability.

The temperature of the peel when first added to the hot oil is not critical. Naturally, since the peel has never been frozen, its temperature will at least be above the freezing point of water. Moreover, it would be pointless and indeed might react adversely to preheat the peel to a temperature high enough to bring about cooking of the peel if the peel were maintained at such a high pre-dehydrating temperature. Accordingly, on the practical grounds just given, the range of temperature for the peel just prior to adding to the hot oil may be set at a minimum of about 1° C and a maximum of about 40° C. As a practical matter, very low temperatures, such as below 5° C are not too desirable because of the subsequent cooling effect on the hot oil, requiring additional heat to be supplied thereto. Conversely, very high temperatures, such as in excess of about 35° C, are not particularly desirable because of the danger that the peel may be held at such a temperature too long before adding to the hot oil so that cooking takes place, as distinguished from the rapid dehydration effected by the invention.

THE PROCESS AND THE PRODUCT

The accompanying drawing is a flow sheet representing the various steps and stages of the process hereof.

In summary, the process involves the rapid removal of the natural water content from fresh, raw, unfrozen citrus peel by immersion of pieces or particles thereof in a hot edible vegetable oil (or partially hydrogenated vegetable oil) above the boiling point of water, e.g., at about 275° F, for a time to remove much of the water, such as for about a half hour, followed by finishing under vacuum in the hot vegetable oil, whereby to remove that portion of the water more tightly bound within the cellulose-protopectin complex without overheating and thus lower the water content into a preferred range of about 4 to 10 percent, more particularly approximately 8 percent, by weight.

The citrus peel, which is commonly received in the half-shell (cups) from juicing operations, is desirably subdivided into appropriate sizes, such as quarters, strips, diced particles or shaved portions. It may be whole peel including both the outer colored layer or flavedo and the inner white layer or albedo. Or it may be shaved to eliminate the flavedo, or to recover the flavedo only for a particular use. Or it may be very lightly shaved to merely clean the surface and leave most of the pigmented portion and essential oils. Since the inner surface of the peel from juicing operations commonly carries a quantity of stringy fiber known as "rag," this is usually removed, but such is not required.

Citrus fruit peels such as those of lemons and oranges, when treated in accordance with the invention have great utility because the flavors and colors of these peels are very attractive for addition to other foods such as prepared cake, cookies, and dessert mixes.

IN DETAIL

Referring to the outline expressed by the flow sheet, several specific examples are now furnished as representative of the preferred form of the invention.

EXAMPLE 1

A batch of 150 pounds of raw, whole navel orange peel cut into quarters was prepared. By the term "whole" is meant raw peel embodying both the outer colored flavedo layer containing the carotenoid pigment which it is desired to preserve and also the inner white albedo layer. The prepared peel was placed in a perforated stainless steel basket having a hinged lid of similar construction and immersed in an open steam jacketed reactor containing 400 pounds of food grade soybean oil at 275° F. After 27 minutes boiling at atmospheric pressure, the reactor was closed and the boiling orange peel bath subjected to a 26.5 inch vacuum for 5 minutes during which time the oil temperature fell and then recovered to 214° F. The vacuum was then broken and the basket raised above the surface of the hot oil. The oil was allowed to drain from the peel for 10 minutes. The peel was then found to have a moisture content of 7.9 percent. The 150 pound orange peel charge yielded 60 pounds of dehydrated product.

EXAMPLE 2

A like charge of quartered navel orange peel was similarly treated with the difference that a 26 inch vacuum was used with a temperature drop and recovery to 212° F, and the soybean oil was removed by centrifuging the peel for 2 minutes at 1,000 RPM with a similar yield. The basket of peel was lowered into a second jacketed reactor containing a hot syrup at 220° F made up of 50 percent glycerol and 50 percent dextrose monohydrate, and the peel immersed in the hot syrup. A 26 inch make-and-break vacuum treatment was applied five times to fully impregnate the peel. After the last vacuum break, the basket was raised above the surface of the syrup and the excess syrup allowed to drain from the peel for 5 minutes. The product yield was 79 pounds of impregnated dehydrated orange peel containing 4.7 percent moisture. These products had the attractive carotenoid color of natural peel.

EXAMPLE 3

A batch of 150 pounds of whole lemon peel in a basket such as that of Example 1 was immersed for 5 minutes at room temperature in a water solution of stannous chloride containing about 0.125% $SnCl_2$ by weight of the peel to prevent a grayish discoloration that typically develops in dehydrated lemon peel. After draining the aqueous solution from the peel for 5 minutes, the basket and the peel were immersed in a reactor as in Example 1 containing hot soybean oil at 275° F under atmospheric pressure for 25 minutes. This was followed by vacuum treatment at about 26 inches for 15 minutes during which the oil temperature dropped and recovered to 215° F. The basket was raised above the oil, the vacuum broken, and the product drained for 5 minutes, yielding 35 pounds of dehydrated lemon peel having 8.5 percent moisture and a natural yellow color.

EXAMPLE 4

Lemon peel treated as in Example 3 was impregnated for 5 minutes by the previously described make-and-break technique at 222° F in a hot syrup composed of 50 percent glycerol and 50 percent dextrose monohydrate. The peel was drained for 5 minutes, yielding 47 pounds of dehydrated impregnated lemon peel containing 5.5 percent moisture.

EXAMPLE 5

Raw whole orange peel in the form of 150 pounds of quarters was treated as in Example 1 in hot soybean oil at about 275° F for 22 minutes at atmospheric pressure, and then for 18 minutes under 26 inches vacuum with a temperature fall and recovery to 211° F. After breaking the vacuum and centrifuging the peel for 2 minutes at 1,000 RPM, the peel was impregnated for five minutes by the previously described make and break vacuum technique in hot (220° F) syrup of 50 percent glycerol and 50 percent dextrose as in Example 4. After draining off the syrup for five minutes a yield of 74 pounds of impregnated dehydrated peel having 5 percent moisture was recovered.

The use of stannous ion ($Sn^{++}$) to control the off-color development is particularly important and valuable for processing lime and lemon peels but may be considered optional with the other varieties of citrus peels which do not contain the xanthophyll pigments of the type found in the skins of lemons and limes. Although stannous chloride is suitable, other stannous salts that have some water solubility, such as di-sodium stannous citrate, may be used.

The temperatures and proportions of the above examples are not critical. However, they represent good operating techniques, although others are usable. Thus, the first dehydration stage of 275° F inactivates the pectin enzymes, kills bacteria, and is an efficient dehydration temperature for immersing the raw peel to effect the quick dehydration of this process, but a range of perhaps 220° F to 325° F is commercially feasible. To protect the edible oil from oxidation and polymerization on reuse, it is important that the temperatures be well below that of deep-fat frying. For a very brief operating period, an even higher immersion temperature (such as 300° F to 400° F) might be usable. Lower temperatures obviously require more time and the higher temperatures require correspondingly less time, to achieve a satisfactory first-stage moisture content which is in the range of approximately 10 to 25 percent. The vacuum temperature range may vary between the highest temperature employable (as above indicated) down to where it ceases to be practically effective for volatilizing the water to be removed, such as 170° F. Similarly, the vacuum treating periods and drainage or centrifuging times vary as functions of practical operations as do the vacuum values. From the standpoint of first stage heat treating in an oil, if the temperature is 250° F when peel is first immersed, time required might be in a range of 30 to 50 minutes, and a temperature of 300° F might require only 15 to 25 minutes. These are readily determinable by close observation of the peel during processing or by determining moisture content of peel samples as by the toluene distillation method.

The vegetable oils which are usable are preferably those that are normally liquid including the mentioned soybean and coconut oils, as well as corn oil, peanut oil, cottonseed oil, rice oil, a specially prepared oil known by the trade name Durkex 500, and even the highly unsaturated safflower oil. Hydrogenated shortenings such as Crisco may also be used. Although it would seem that relatively unstable triglyceride oils such as soybean and coconut oils, that are normally considered to be oxidation-prone, would not be satisfactory, I have made the surprising discovery that citrus peels dehydrated in such oils have, unexpectedly, a very good storage life. A further discovery is that soybean oil which is normally subject to flavor reversion is superior to cottonseed oil and that coconut oil yields products even more stable with a storage life of a year or more. For extra storage life, small amounts of food antioxidants, up to about 0.02 percent, may be added to the oils, such as butylated hydroxy anisole (BHA) and butylated hydroxy toluene (BHT).

Usable citrus peels include the following, namely, lemon, navel orange, valencia orange, grapefruit, tangerine, and even lime and tangelo peels, in a fresh, raw condition, never having been frozen. The peels are subdivided into suitable sizes for processing, such as quarters, eighths, strips, and diced and shredded portions as desired. Other fruits as previously mentioned may be used. The finished product, whether dehydrated only or also impregnated with the hardening, stabilizing and preserving glycol-sugar syrup, may be further subdivided as in a hammermill (Fitzmill) to reduce to small "bite" sizes for cakes and other baked goods, or it may be still further reduced as by grinding to condiment or spice size such as in the range of 10 to 20 mesh and then if desired additionally tumbled with a suitable anticaking agent such as starch, magnesium carbonate, diatomaceous earth, etc., to yield a free-flowing product. During grinding, contact of the peel with such metals as iron or copper should be avoided as the peel may become off-colored.

With respect to using the impregnating preserving syrup on the dehydrated fibrous citrus peels, these syrups impart maximum utility and stability, and later facilitate rehydration to yield a product having good "mouth feel" or "bite" when added to cakes and the like. The presently preferred impregnating syrup is 50 percent dextrose dissolved in 50 percent hot glycerol. Alternatively, dextrose (about 58 percent) dissolved in hot propylene glycol (about 42 percent) may be used but is less desirable, particularly with respect to flavor. Again, a molten solution of dextrose monohydrate heated to dissolve in its own water of crystallization or in a generally corresponding small amount, say 5 to 20 percent, of edible polyol such as glycerol, propylene glycol, or 1, 3-butanediol may be used. Other sugars that may be used at least in part include sucrose, maltose, lactose, fructose and corn syrup solids.

Several other important functions of the impregnating sugar-polyol syrup are:

1. The residual vegetable oil level in the dehydrated peel is lowered by displacement during impregnation;

2. The semi-solid syrup acts along with the vegetable oil to prevent loss of essential volatile oils remaining in the peel as well as the possible development of terpiness or rancidity. Chemical tests for peroxide number indicates that the residual vegetable oil in dehydrated peel is well protected against rancidity by the impregnation process.

3. Protects the colored peel carotenoids and xanthophylls from oxidative breakdown that yield products of poor odor and flavor having straw-like character;

4. Improves the color of the dehydrated peel pieces by rendering them semi-translucent;

5. Imparts humectant properties making the dried peel softer and more quickly and easily reconstituted than horny air-dried pieces. For use in many convenience foods, quick reconstitution is a "must" for success;

6. The presence of the polyol protects against mold growth should moisture exceed about 10 percent.

Upon reconstitution or rehydration with water, the dehydrated peel pieces swell to their original volume or larger as compared with raw peel. This is unexpected since dehydrated pieces of peel generally never swell to equal their original volume. In general, 1 pound of dehydrated peel (with or without impregnation with polyol-sugar syrup) is equivalent to over 3 pounds of rehydrated peel. Reconstitution in sugar syrups, such as sucrose, may bring the product to over 4 pounds.

By the present process, it is possible to up-grade citrus peel to a tasty nutritious product for human consumption, where the original material normally would have been used for making dried cowfeed. It is a matter of common knowledge and experience that raw, fresh citrus peels are normally considered inedible by human beings, who eat the pulpy portions of the fruit enclosed by the peel. Thus, the invention enables the conversion of a normally non-edible agricultural product to an edible comestible for human beings. The color of the peel product is that of the natural carotenoids. The peel product, although dehydrated in a hot oil bath to a relatively low moisture content, surprisingly retains appreciable amounts of the heat-labile vitamin C, in a range of about 130 to 160 mg per 100 gms of the dehydrated peel. No dehydrated peel materials commercially available are known that contain more than trace amounts of vitamin C.

An important feature is that the dehydrated peel pieces upon rehydration become uniformly soft for use in baked goods and the like, without offering the usual problem of hardened lumps resulting from drum or air drying. Although the mechanism is not apparent, we have observed that peel dehydrated in the presence of hot oil has quite different characteristics from peel dried by any other means. Conceivably, this unexpected flavorable result may be due to the rupture of fibrous bonds within the peel because of the almost explosive release of steam from the interior of the peel during dehydration. Peel products as herein described reconstitute in water quickly and uniformly without hard lumps or case-hardened pieces. Since the product may be provided in any desired size and shape it is usable for cake and cookie mixes, fruit cakes, and pies, as well as for icings, and being reducible to condiment size it may be applied from shaker top dispensers, and may also be sprayed with or dipped in melted glyceryl monostearate or other liquid or semiliquid material to produce non-tacky superior coatings.

The examples heretofore furnished disclose procedures which are somewhat different in some respects and which yield somewhat different products. Also, a given weight of lemon peel yields an appreciably smaller weight of product than does orange peel. Again, the residual water content of the impregnated citrus peel is usually smaller than that which is only hot-oil treated. Thus, the latter, as appears from the examples, may have a moisture content of around 8 to 9 percent, whereas the impregnated product may have a moisture content of only 5 to 6 percent.

Again, these products may vary greatly in the relative proportions of oil to moisture-free citrus peel. Thus, while often it is deemed preferable to have a lower vegetable oil content than dry citrus peel content, such as one part oil to two and one-half or three parts citrus peel, it is feasible sometimes that these proportions be reversed so that there is more oil than solids. Further, there might be as little as one part dry-base solids to four or five parts oil, depending upon the use to which the product is to be put.

Also, the polyol-sugar content of impregnating hardenable material is commonly considered optimum when it amounts to about one-half the impregnated product, but this may be varied rather widely as to a given composition or from composition to composition, which compositions may include others than those mentioned, although in general of similar type, as obvious to the chemist and the confectioner.

In order the better to indicate ranges which are signified above, tables are given below which provide specific examples as well as ranges usable for the various materials.

Typical Compositions of Citrus Peel Products Dehydrated in Hot Vegetable Oils

| Not Impregnated Specimens | I | | II | III | IV | | Range |
|---|---|---|---|---|---|---|---|
| | Parts | | | | Parts | | |
| Vegetable Oil | 26% | = 1 | 66% | 45% | 37% | = 2 | 18% to 80% |
| Peel Solids | 66% | = 2.5 | 26% | 45% | 56% | = 3 | 80% to 18% |
| Water Content | 8% | | 8% | 10% | 7% | | 3% to 12% |

| Peel Impregnated in Hot Polyol-Sugar Syrup | | | | | | |
|---|---|---|---|---|---|---|
| Specimens | A | B | C | D | E | Range |
| Vegetable Oil | 13% | 13% | 9% | 40% | 18% | 9% to 40% |
| Peel Solids | 33% | 33% | 40% | 9% | 27% | 40% to 9% |
| Water | 5% | 5% | 7% | 5% | 5% | 3% to 10% |
| Glycerol | 24% | | 22% | | 25% | 20% to 30% |
| Dextrose | 25% | | 22% | | 25% | 20% to 30% |
| Dextrose | | 28% | | 24% | | 25% to 35% |
| Propylene Glycol | | 21% | | 22% | | 18% to 28% |

As indicated by the above tables, in products not impregnated by polyol-sugar mixtures, the oil to peel solids ratio may often be one part oil to about 2.5 parts peel solids, or two parts oil to three parts peel solids, the latter being a 40 to 60 percent ratio. Again, these ratios may be reversed when much higher oil relationships are desired. These oil to peel solids ratios exist also in the polyol-sugar impregnated products. In the latter it is generally preferred that the sugar impregnant be approximately half the product, but the impregnant might be much less, such as one-fourth the product, according to the amount of stabilizing and bodying material needed or desired. It might also be somewhat greater than one-half if desired to improve body or flavor characteristics or the like.

Thus, the various percentages and proportions given are not critical even though optimum. Further, where relatively minor percentages might be indicated, these may be enlarged with respect to other constituents. This applies especially to flavor-fixative agents such as the mentioned polyol-sugar mixtures, in connection with which almost any proportion may be used which will control oxidation and volatility of the essential oils of the citrus peel solids, for example, sucrose and glycerol with lemon peel where the sucrose might range from 20 to 80 percent of the impregnating agent. Also, the various impregnating agents may be used for the indicated pruposes even though dehydration to the indicated low moisture range may have been attained by other means (such as hot air drying under vacuum). This will apply, for example, to the indicated use of glyceryl monostearate alone for the preparation of a dry free-flowing condiment-like material wherein the dehydrated lemon peel or the like is sprayed with or dipped in melted glyceryl monostearate as heretofore mentioned.

As previously stated, and as exemplified in the examples, my invention utilizes fresh, raw citrus peel, in the state commonly received from juicing operations. Thus, the peel is not subjected to any previous freezing treatment, for then it would no longer be describable as fresh, raw peel.

I claim:

1. A method for preparing a stable dehydrated citrus peel food product, including the steps of immersing fresh, raw, unfrozen citrus peel in a hot vegetable oil at a temperature of from about 220° F to about 400° F for a time sufficient to boil out the major portion of the natural water content and to replace it with the hot oil, subjecting the hot oil containing the citrus peel to vacuum to further reduce the water to less than about 15 percent, and thereafter breaking the vacuum and separating the hot oil in any order, and recovering the dehydrated peel.

2. The method in accordance with claim 1 wherein said fresh, raw, unfrozen citrus peel has a temperature within the range of about 1° C to about 40° C at the time of immersion in said oil.

3. A method of dehydrating raw, fresh, unfrozen citrus peel as in claim 1 and the additional step subsequent to the steps of claim 1 of immersing the dehydrated portions under vacuum in a hot sugar-and-polyol-containing syrup to effect impregnation, and removing excess syrup, the syrup being hardenable upon cooling.

4. A method of preparing a citrus peel product as in claim 1, and the additional procedure subsequent to the steps of claim 1 of immersing the dehydrated product in a hot bath of a sugar-containing composition under vacuum to impregnate the peel, the sugar composition being hardenable upon cooling to impart a stabilizing body to the product, and recovering the impregnated dehydrated product.

5. A method as in claim 1 wherein the citrus peel is lemon peel and the peel is treated before dehydration in an aqueous solution containing a minor proportion of stannous chloride to control discoloration.

* * * * *